United States Patent [19]
Fischer et al.

[11] Patent Number: 4,696,700
[45] Date of Patent: Sep. 29, 1987

[54] INORGANIC PIGMENTS AND PROCESS FOR THEIR PRODUCTION

[75] Inventors: Robert Fischer, Obertshausen; Dieter de Ahna, Egelsbach, both of Fed. Rep. of Germany

[73] Assignee: Degussa Aktiengesellschaft, Frankfurt am Main, Fed. Rep. of Germany

[21] Appl. No.: 512,992

[22] Filed: Jul. 12, 1983

[51] Int. Cl.$^4$ .................. C04B 14/30; C08K 3/22; C09C 1/10
[52] U.S. Cl. .................. 106/291; 106/292; 106/301; 106/302; 106/304
[58] Field of Search .............. 106/291, 292, 301, 302, 106/304

[56] References Cited

U.S. PATENT DOCUMENTS

| | | | |
|---|---|---|---|
| 2,269,508 | 1/1942 | Barton | 106/292 |
| 2,644,767 | 7/1953 | Ducan | 106/292 |
| 3,070,422 | 12/1962 | Bayer | 106/288 |
| 3,748,165 | 7/1973 | Ramsey | 106/288 |
| 3,785,842 | 1/1974 | Murray | 106/288 |

FOREIGN PATENT DOCUMENTS

| | | |
|---|---|---|
| 0075186 | 3/1983 | European Pat. Off. |
| 2153129 | 10/1971 | Fed. Rep. of Germany |
| 2840870 | 3/1980 | Fed. Rep. of Germany |

*Primary Examiner*—John Kight
*Assistant Examiner*—Garnette D. Draper
*Attorney, Agent, or Firm*—Cushman, Darby & Cushman

[57] ABSTRACT

Inorganic pigments, especialy cobalt pigments, having a spinel structure and higher covering power are obtained if these pigments have a platelet shape. Platelet shape is produced by continuously moving the mixture during the calcining and further intermixing, preferably in a rotary kiln or high temperature cyclone.

22 Claims, No Drawings

INORGANIC PIGMENTS AND PROCESS FOR THEIR PRODUCTION

BACKGROUND OF THE INVENTION

The invention is directed to inorganic pigments, especially cobalt containing inorganic pigments having a spinel structure and higher covering power and a process for their production.

A considerable portion of inorganic bright colored pigments are derived from the crystallographic group of spinels. These have the general formula $AB_2O_4$ wherein A is an element in its divalent form and B is an element in its trivalent form. There is also known the case that A stands for a trivalent cation and B for a divalent cation. There come into consideration as divalent elements especially the elements Co, Ni, Cu, Zn, Cd, Mg, Mn, Fe and as trivalent metal ions Al, Cr, Ga, In, La, V.

In practice this multitude of elements also means a considerable breadth in variation of the colored body, especially in the coloristic pigment properties. This means that that inorganic bright colored pigments based on spinels represent pure chemical products only in the rarest case.

A known material is the cobalt-aluminum spinel, $CoAl_2O_4$, which e.g. can be modified with $Cr^{III}$.

This compound is also known under the trivial names cobalt blue, Leyden blue, Kings' blue and Thenard's blue. In ceramics they find use as blue coloring components and in the synthetic resin industry they are used as pigments for the production of light fast and weather resistant colors.

The customary processes for the production of cobalt pigments having a spinel structure are described in the appropriate literature. Thereby, e.g. cobalt oxide and aluminum oxide in powder form are vigorously intermixed and calcined at a temperature of around 1000° C. for several hours in crucibles. As aids to the reaction there are frequently utilized so-called mineralizers, such as e.g., NaCl, $CaCl_2$, KCl and $CaSO_4$. Calcined products produced in such manner then are ground to pigment fineness. In enlargement these pigments show grain forms which resemble basalt splinters.

An alternative precipitation process with subsequent calcination for the production of cobalt blue is described in German OS No. 2840870. The covering power of this pigment, however, is very poor because of its small particle size, there are obtained only transparent blue tones.

However, for many uses it is necessary for pigments to have higher covering power and greater spreadability. Therefore it was the problem of the present invention to provide an inorganic pigment, especially a cobalt containing inorganic pigment, having a spinel structure which has a high covering power and a great spreadability. Besides there should be developed a process for the production of such pigments.

SUMMARY OF THE INVENTION

This problem was solved according to the invention by having the pigment in the form of platelets.

As pigments there can be employed any of the types mentioned above, i.e. of the formula $AB_2O_4$ where A is an element in its divalent form and B is an element in its trivalent form or where A is a trivalent cation and B is a divalent cation. As divalent elements there can be used for example the elements Co, Ni, Cu, Zn, Cd, Mg, Mn, Fe and as trivalent metal ions Al, Cr, Fe, Ga, In, La, V.

Advantageously at least 50% of the pigment particles of a batch have a hexagonal platelet form. There are obtained through this pigments which have a high covering power and a great spreadability.

Preferably these platelet shaped spinels are produced by mixing the components with each other in known manner and calcining at a temperature above 1000° C., whereby, however, the mixture is continuously moved during the calcining and further intermixing. This advantageously takes place in a rotary kiln or a high temperature cyclone.

In the following examples there are employed two alternative processes of production of platelete shaped cobalt blue pigments. These colors can be changed in wide range with other cations. The selection of the examples of pigments of the system Co—Al—O is not limited to this specific system.

Unless otherwise indicated all parts and percentages are by weight.

The process can comprise, consist essentially of or consist of the stated steps with the recited materials.

EXAMPLE 1

Cobalt hydrate and aluminum hydrate were mixed in such manner that there was obtained a molar ratio $CoO:Al_2O_3 = 1:1$. Preferably the mixing is carried out under wet conditions in order to obtain a homogeneous mixture. After complete mixing of the components the pulp obtained was dried in a drying oven.

The dry crude mixture was then ground to a fineness of less than 5 $\mu$m. This powder underwent a flash calcination in a high temperature cyclone.

At a residence time of material of about 1.5 sec and a temperature of about 1,350° C. there was obtained a platelet shaped cobalt blue pigment which contained as the main phase $CoAl_2O_4$ (Astm. No. 10-458). This pigment batch which far exceeded 50% platelets, preferably in hexagonal form is outstandingly suited for coloring ceramic glazes and synthetic resin articles.

EXAMPLE 2

The crude mixture of Example 1 dried in a drying oven was calcined in a rotary kiln without further comminution. The residence time was 20 minutes at a calcining temperature of about 1,100° C. Any agglomerates formed were disintegrated dry. The pigments are used in ceramic and polymer areas. Also in this process of production there is formed almost exclusively platelet shaped modifications of the cobalt blue pigments.

EXAMPLE 3

24 kg of cobalt hydroxide, 30 kg of aluminum hydroxide and 19 kg of chromium oxide were wet mixed with addition of water. After complete drying of the moist mixture in a drying oven at a temperature above 100° C. the procedure was as set forth in Example 2. There was obtained a blue-green pigment having good coloristic properties which was distinguished by a large portion of platelets.

The particle diameter in these production examples is in the range of 0.3 to 1 $\mu$m and they had a thickness of 0.05 to 0.2 $\mu$m. Hereby it is surprising that the pigments normally crystallizing in the cubic crystal system form platelets especially hexagonal platelets.

The entire disclosure of German priority application No. P3225897.6 is hereby incorporated by reference.

What is claimed is:

1. In an inorganic pigment having a spinel structure and having the formula $AB_2O_4$ where A is at least one of Co, Ni, Cu, Zn, Cd, Mg, Mn and Fe and B is at least one of Al, Cr, Fe, Ga, In, La and V, the improvement wherein a substantial portion of said pigment has the form of platelets, wherein the pigment has high covering power.

2. An inorganic pigment according to claim 1 wherein at least 50% of the pigment particles are in the form of platelets.

3. An inorganic pigment according to claim 2 which the pigment particles have a hexagonal platelet shape.

4. An inorganic pigment according to claim 3 wherein the pigment platelets have a thickness of 0.05 to 0.2 $\mu$m and a particle diameter of 0.3 to 1 $\mu$m.

5. An inorganic pigment according to claim 2 wherein the pigment platelets have a thickness of 0.05 to 0.2 $\mu$m and a particle diameter of 0.3 to 1 $\mu$m.

6. An inorganic pigment according to claim 5 wherein the pigment is a cobalt containing pigment.

7. An inorganic pigment according to claim 4 wherein the pigment is a cobalt containing pigment.

8. An inorganic pigment according to claim 3 wherein the pigment is a cobalt containing pigment.

9. An inorganic pigment according to claim 2 wherein the pigment is a cobalt containing pigment.

10. An inorganic pigment according to claim 1 wherein the pigment is a cobalt containing pigment.

11. An inorganic pigment according to claim 8 wherein the pigment consists essentially of CoO and $Al_2O_3$ or CoO, $Al_2O_3$ and $Cr_2O_3$.

12. An inorganic pigment according to claim 7 wherein the pigment consists essentially of CoO and $Al_2O_3$ or CoO, $Al_2O_3$ and $Cr_2O_3$.

13. An inorganic pigment according to claim 6 wherein the pigment consists essentially of CoO and $Al_2O_3$ or CoO, $Al_2O_3$ and $Cr_2O_3$.

14. A process for the production of an inorganic pigment according to claim 2 comprising mixing the components needed to form a product of the formula $AB_2O_4$ and heating and calcining at a temperature above 1000° C., continuously moving the mixture during the calcining and continuously further intermixing.

15. A process for the production of an inorganic pigment according to claim 9 comprising mixing the components needed to form a product of the formula $AB_2O_4$ and heating and calcining at a temperature above 1000° C., continuously moving the mixture during the calcining and continuously further intermixing.

16. A process according to claim 15 wherein the movement and further mixing is carried out in a rotary kiln or a high temperature cyclone.

17. A process according to claim 14 the movement and further mixing is carried out in a rotary kiln or a high temperature cyclone.

18. A process according to claim 14 wherein the calcination is carried out for a time not over about 20 minutes.

19. A process according to claim 14 wherein the temperature is about 1100° to about 1350° C.

20. An inorganic pigment according to claim 1 wherein far in excess of 50% of the pigment is in platelet form.

21. An inorganic pigment according to claim 1 wherein the pigment is almost exclusively in platelet form.

22. An inorganic pigment according to claim 1 wherein at least 50% of the pigment is in platelet form.

* * * * *